(12) United States Patent
Klees et al.

(10) Patent No.: US 7,328,611 B2
(45) Date of Patent: Feb. 12, 2008

(54) LEVEL MEASUREMENT ARRANGEMENT

(75) Inventors: Daniel Klees, Greenwood, IN (US);
Ola Wesstrom, Greenwood, IN (US);
Greg Miscik, Greenwood, IN (US); Joe Schaffer, Greenwood, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/740,921

(22) Filed: Dec. 22, 2003

(65) Prior Publication Data

US 2005/0132797 A1 Jun. 23, 2005

(51) Int. Cl.
*G01F 23/284* (2006.01)

(52) U.S. Cl. .................................... 73/290 V
(58) Field of Classification Search ............. 73/290 V
See application file for complete search history.

(56) References Cited

U.S. PATENT DOCUMENTS 3,851,333 A * 11/1974 Fishman ............... 137/487.5
4,566,321 A * 1/1986 Zacchio ................. 73/290 R
5,507,181 A * 4/1996 Fox et al. ............... 73/290 V
5,703,289 A * 12/1997 Mulrooney .............. 73/290 V
6,538,598 B1 * 3/2003 Wilkie et al. ............ 342/124
6,834,546 B2 * 12/2004 Edvardsson ............. 73/290 V

FOREIGN PATENT DOCUMENTS

DE 4327333 A1 * 2/1995

\* cited by examiner

*Primary Examiner*—Hezron Williams
*Assistant Examiner*—Paul M West
(74) *Attorney, Agent, or Firm*—Bacon & Thomas, PLLC

(57) ABSTRACT

An Arrangement for the measurement of a level of a medium in a container the arrangement allows for removal of the microwave level measurement device, without opening the container, which allows use of standard connectors. The arrangement comprises: a mounting section surrounding an opening of the container; a tubular adapter comprising a first standard connector located on a first end of the adapter and a second standard connector located on a second end of the adapter, which is mounted on the mounting section of the container by the first standard connector; an isolation window transparent for microwaves seating a passageway through the adapter having an outer rim, which is clamped between the mounting section and the first standard connector; and a microwave level measurement device, comprising a standard process connector to be mounted on the second connector of the adapter.

5 Claims, 3 Drawing Sheets

LEVEL MEASUREMENT ARRANGEMENT

FIELD OF THE INVENTION

The present invention relates to an arrangement for measurement of a level of a medium in a container, wherein a microwave level measurement device is mounted on a mounting section surrounding an opening of the container.

BACKGROUND OF THE INVENTION

In many branches of industry, products are stored or processed in containers, e.g. tanks, vessels or others. It has become a very important field of measurement technology to determine a level of a medium inside a container. Level measurements are valuable means in process control as well as in process automation.

One method of level measurement used today involves the use of short electromagnetic waves, in particular microwaves. Microwave level measurement devices transmit microwaves through an opening in the container toward the surface of the medium inside and receive echo waves of the transmitted microwaves. From the received echo waves an echo function representing echo amplitude as a function of the distance or time is formed for each measurement. A transit time of a microwave signal to travel from the device to the surface and of its echo to return to the device is determined based on the echo function. The distance between the device and the surface is then determined based on the transit time.

Various microwave level measuring techniques are known which permit short distances to be measured by means of reflected waves. The most frequently used systems are pulse radar and frequency-modulated continuous wave radar (FMCW-Radar).

Pulse radar level measurement devices periodically send short microwave pulses. The transit time between the transmission of the microwave pulse and the reception of its echo is measured and the level is determined based on the transit time.

FMCW radar level measurement devices transmit a continuous microwave signal, which is periodically linearly frequency modulated. The frequency of the received echo signal differs from the frequency of the transmitted signal by an amount, which depends on the transit time between the emission and the reception of the corresponding echo.

The microwave signals are transmitted and received via antennas. Commonly used antennas are for example horn antennas comprising a metal horn, rod antennas comprising a dielectric rod or planar antennas using microstrip line technology, as for example described in U.S. Pat. No.-B1 6,266,022.

In many branches of industry, containers may not be opened, when in use, due to hygienic or safety reasons. In the Pharmaceutical Industry it is for example essential to keep the containers sealed, in order to prevent any kind of contamination, e.g. bacteria, from entering. Even air can cause contamination of a medium inside the container.

On the other hand, there is a need in industry, to be able to service, recalibrate, repair or even replace microwave level measurement devices installed on the container.

Today microwave level measurement devices are usually mounted on a mounting section surrounding an opening of the container. Removal of the device leaves the interior of the container exposed to the environment. Correspondingly, contamination of a medium inside the container is possible. In order to prevent contamination, the container needs to be emptied before the device can be removed and the entire container needs to be cleaned and or sterilized after the device has been reinstalled on the container before the medium is reintroduced to the container. This is a costly and time intensive procedure. In some applications, for example in the bio-pharmaceutical industry, it is impossible to stop production processes, to allow for repair or replacement of microwave level measurement device. The reason for this is, that a sanitary seal would be broken. This would contaminate the product and could mean, that biological actions could be disturbed and weeks or even month of fermentation would need to be restartet.

In order to avoid these costs and the related loss of production time, there is a need for an assembly for microwave level measurement that allows removal of the microwave level measurement device, without opening the container.

In the past there have been applications for microwave level measurement devices, where engineers have physically separated microwave level measurement devices from the contents of the container, in order to protect the level measurement device from difficult measurement conditions, caused for example by high and/or constantly varying temperatures or pressures or by explosive, corrosive or toxic media. This problem is addressed in WO 95/12113.

In WO 95/12113 an arrangement for measurement of a level of a medium in a container is described, comprising a mounting section surrounding an opening of the container. A horn antenna of a microwave level measurement device is mounted on the mounting section. The mounting section described in the application is an annular flange, which is welded onto the tank. A window transparent for microwaves is foreseen, which is held inside a holding ring. The window is made of glass or ceramic. The holding ring is screwed onto the container such that the isolation window covers the opening. The holding ring is surrounded by the mounting section. The holding ring is fastened by screws, which are screwed into tapped holes in the container wall surrounding the opening.

Because of the rather complex design of the assembly described, the horn antenna and thus the microwave level measurement device connected to it cannot be mounted on standard mounting sections as they are generally foreseen on industrial sites. In many branches of Industry, users are very reluctant to use non-standard mountings. Any non-standard part is likely to increase the cost of operation. They make operation logistics and stockholding of spare parts more complex. In addition, it might become more difficult to obtain approval for operation by national authorities.

The company Thermo Measure Teck, based in 25555 North IH 35, Round Rock, Tex. 78664-2015 in the United States of America offers an arrangement for measurement of a level of a medium in a container on the world wide web, comprising:

a mounting section surrounding an opening of the container, a tubular adapter comprising a flange located on a first end of the adapter
which is mounted on the mounting section of the container by the flange, an isolation window transparent for microwaves
sealing a passageway through the adapter,
comprising an outer rim, which is clamped between the mounting section and the flange, and a microwave level measurement device, comprising a wave guide and a horn antenna.

The horn of the antenna is mounted on the adapter by a specially designed flange surrounding an end section of the horn, which is mounted on a second end of the adapter facing away from the container.

A gasket is foreseen on either side of the isolation window, which can be made out of various materials such as Polytetrafluorethylen (PTFE), Polypropylene etc.

Both arrangements described above allow for the antenna and thus for the microwave level measurement device mounted on the antenna to be removed without opening the container.

In both arrangements, horn antennas are foreseen which are mounted by specially designed connecting parts holding not only the horn but also the entire microwave level measurement device in place. Horns available vary in size and shape. Because of the complicated design, standard connection cannot be used for mounting the horn in these arrangements.

SUMMARY OF THE INVENTION

It is an object of the invention to provide an assembly for microwave level measurement, allowing removal of the microwave level measurement device, without opening the container, which allows use of standard connectors.

To this end, the invention comprises an arrangement for measurement of a level of a medium in a container, comprising:
  a mounting section surrounding an opening of the container,
  a tubular adapter comprising a first standard connector located on a first end of the adapter and a second standard connector located on a second end of the adapter,
    which is mounted on the mounting section of the container by the first standard connector,
  an isolation window transparent for microwaves
    sealing a passageway through the adapter,
    comprising an outer rim, which is clamped between the mounting section and the first standard connector, and
  a microwave level measurement device, comprising a standard process connector to be mounted on the second connector of the adapter.

Further, the invention comprises an arrangement for measurement of a level of a medium in a container, comprising:
  a mounting section surrounding an opening of the container,
  a tubular adapter comprising a first TRI-CLAMP connector located on a first end of the adapter and a second TRI-CLAMP connector located on a second end of the adapter,
    which is mounted on the mounting section of the container by the first TRI-CLAMP connector,
  an isolation window transparent for microwaves
    sealing a passageway through the adapter,
    comprising an outer rim, which is clamped between the mounting section and the first TRI-CLAMP connector, and
  a microwave level measurement device, comprising a TRI-CLAMP process connector to be mounted on the second connector of the adapter.

According to a refinement of the invention, an antenna of the microwave level measurement device is located inside a tube and the process connector is foreseen on an end of the tube.

According to a preferred embodiment, a sanitary gasket is inserted between the mounting section of the container and the adapter.

According to a preferred embodiment, the isolation window is made of a plastic material.

The invention further comprises a microwave transparent process seal for mounting on a mounting section surrounding an opening of a container, comprising:
  a tubular adapter,
    comprising a first TRI-CLAMP connector located on a first end for mounting the adapter on the mounting section of the container,
    comprising a second TRI-CLAMP connector located on a second end of the adapter, and
  an isolation window transparent for microwaves
    for sealing a passageway through the adapter,
    which comprises an outer rim, which is clamped between the mounting section and the first TRI-CLAMP connector, when the adapter is mounted on the mounting section.

The invention and its advantages are explained in more detail using the figures of the drawing, in which several exemplary embodiments are shown. The same reference numerals refer to the same elements throughout the figures.

DETAILED DESCRIPTION OF THE DRAWINGS

Figure 1:
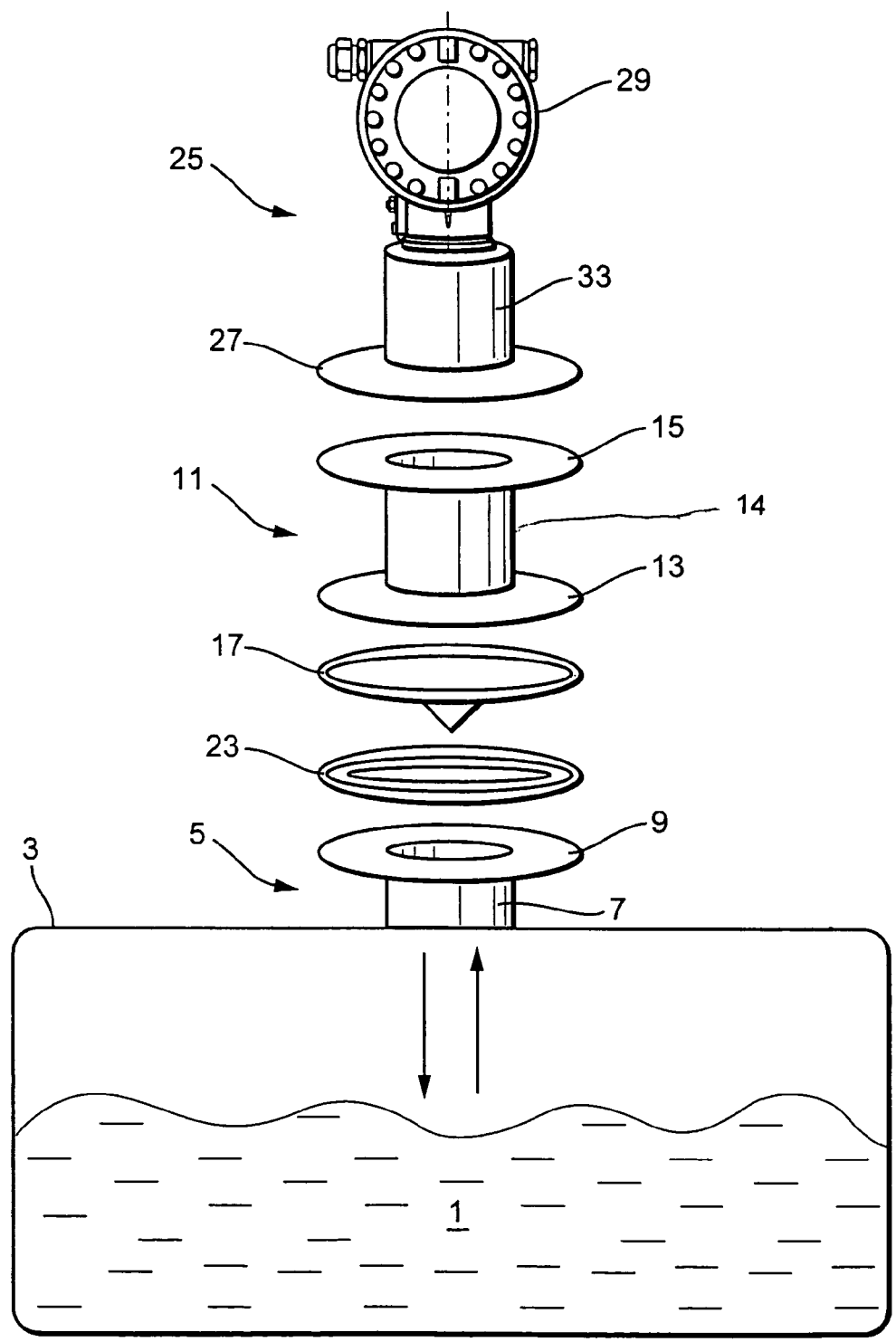
FIG. 1 shows an exploded view of a microwave level measurement assembly according to the invention.

FIG. 1 shows an exploded view of an assembly for measurement of a level of a medium 1 in a container 3. A mounting section 5 is foreseen on top of the container, which surrounds an opening of the container 1. In the embodiment shown, the mounting section 5 comprises a cylindrical tube 7 and a flange 9. The flange 9 is designed according to an industry standard. Preferably, a standard known under the name TRI-CLAMP is used. TRI-CLAMP connectors are very well accepted in industries, where high standards of hygiene need to be fulfilled.

The arrangement comprises a tubular adapter 11 comprising a first standard connector 13 located on a first end of the adapter 11 and a second standard connector 15 located on a second end of the adapter 11. These connectors extending outwardly from a separating wall 14. Again, both connectors 13, 15 are preferably flanges designed according to the tri-clamp standard, as shown in the drawing. The adapter 11 is mounted on the mounting section 5 of the container 3 by the first tri-clamp connector 13.

Figure 2:
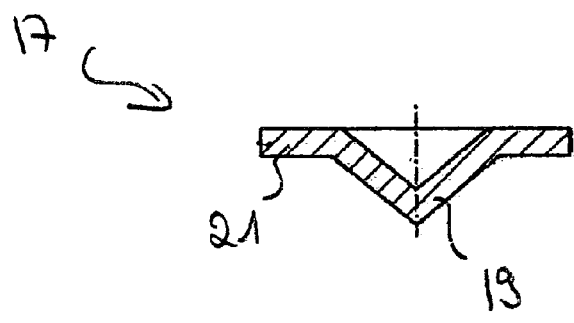
FIG. 2 shows the isolation window of FIG. 1.

An isolation window 17, transparent for microwaves, is located between the adapter 11 and the mounting section 5. It seals a passageway through the adapter 11. FIG. 2 shows a cross-sectional view of the isolation window 17. It comprises a hollow cone 19 and an outer rim 21. The rim 21 extends radially outward from a base of the cone 19. When mounted, a tip of the cone 19 is facing towards the container 3. The cone-shape has the advantage, that condensation or medium coming in contact with isolation window 17 will run down the cone 19 and drip down into the container 3. This prevents built up to accumulate on the isolation window 17, which might otherwise impair microwave signal transmission through the isolation window 17.

The isolation window 17 is made of a plastic material transparent for microwaves, preferably of polytetrafluoroethylen (PTFE).

The rim 21 of the isolation window 17 is clamped between the mounting section 5 and the first tri-clamp connector 13.

Preferably, a sanitary gasket 23 is inserted between the mounting section 5 of the container and the adapter 11. In the embodiment shown, the gasket 23 is an annular ring, which is inserted between the TRI-CLAMP flange 9 of the mounting section 5 and the outer rim 21 of the isolation window 17.

A microwave level measurement device 25, comprising a standard process connector, preferably TRI-CLAMP process connector 27 is mounted on the second TRI-CLAMP connector 15 of the adapter 11.

Figure 3:
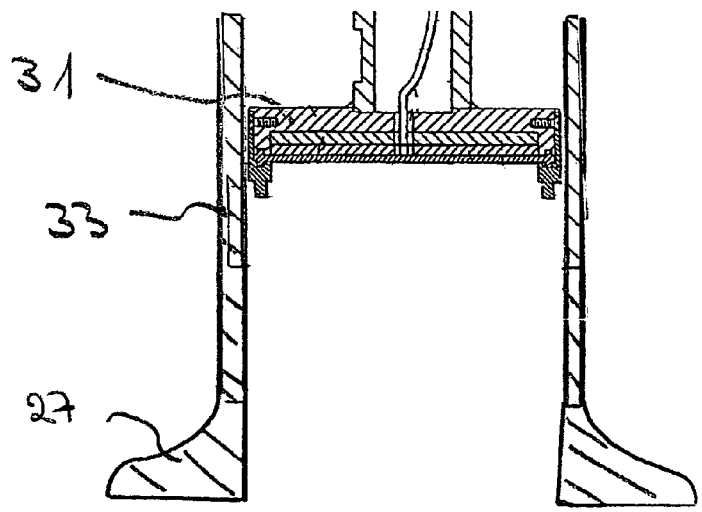
FIG. 3 shows a planar antenna located inside the tube of FIG. 1.

The microwave level measurement device 25 operates for example as a pulse radar or as a frequency-modulated continuous wave radar (FMCW-Radar) device. It comprises an electronic inside a housing 29 and an antenna 31 for transmission and reception of microwave signals. The housing 29 is mounted on a tube 33 and the antenna 31 is entirely located inside the tube 33. FIG. 3 shows a first embodiment of an antenna 31 inside the tube 33. In the embodiment shown, the antenna 31 is a planar antenna as described for example in U.S. Pat. No.-B1 6,266,022.

Figure 4:
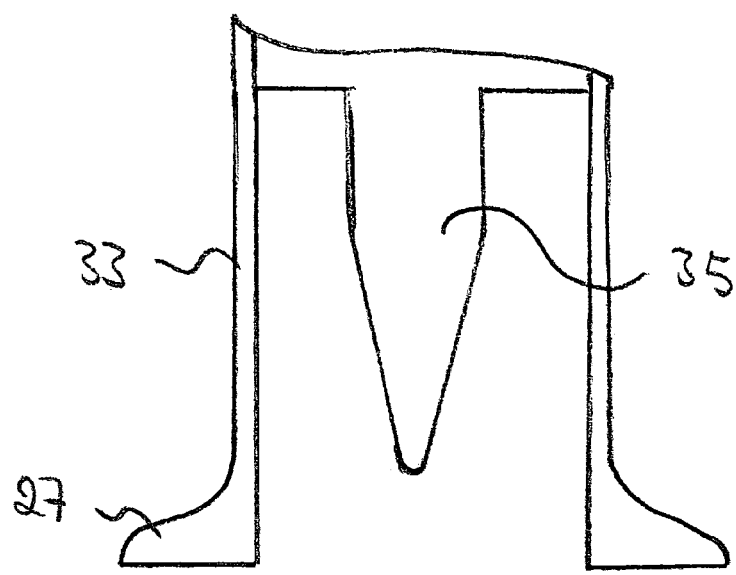
FIG. 4 shows a rod antenna located inside the tube of FIG. 1.
Figure 5:
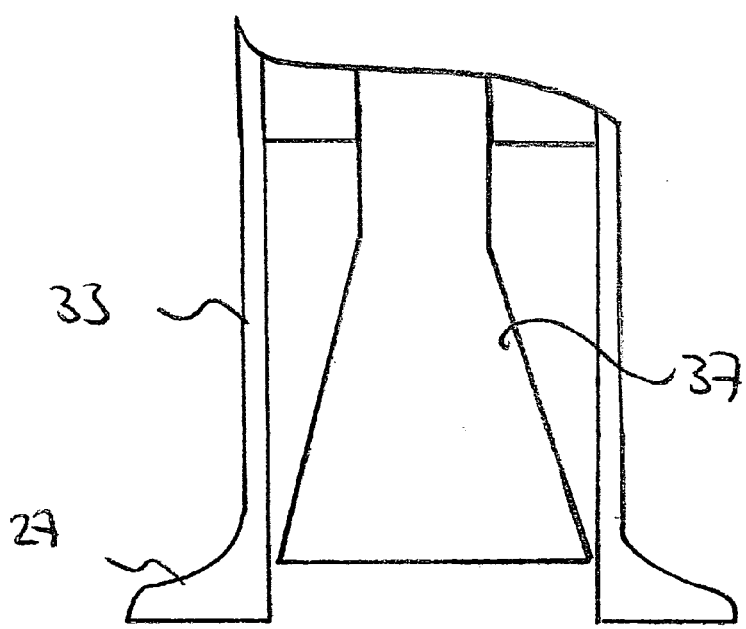
FIG. 5 shows a horn antenna located inside the tube of FIG. 1.

FIGS. 4 and 5 show two further embodiments of antennas inside the tube 33. In the embodiment shown in FIG. 4 the antenna is a rod antenna 35, comprising a full cylindrical rod and a conical tip pointing towards the container 3. It is made of a dielectric material, preferably of Polytetraluorethylen (PTFE). In the embodiment shown in FIG. 5 a horn antenna 37 is located inside the tube 33. It comprises a metal horn, which opens towards the container 3.

The TRI-CLAMP process connector 27 is located on an end of the tube 33 facing away from the housing 29. Since the antenna 31, 35, 37 is entirely located inside the tube 33, it is possible to mount the microwave level measurement device 25 via the TRI-CLAMP process connector 27 independent of the type of antenna 31, 35, 37 chosen. It is thus possible to use a standard connector, here the TRI-CLAMP process connector 27. Special designs and non-standard parts are not needed.

The level measurement arrangements according to the invention, allow removal of the microwave device at any time, without breaking the seal made with flange 9, the first standard connector 13, the gasket 23 and the isolation window 17.

Without the microwave level measurement device, the remaining parts of the arrangement form a microwave transparent process seal for mounting on a mounting section 5 surrounding an opening of a container 3, comprising the tubular adapter 11 and the isolation window 17 for sealing a passageway through the adapter 11.

The use of TRI-CLAMP connectors in combination with a sanitary gasket 23 ensures a very high quality of seal, which is sufficient for nearly all branches of industry. Even very high standards of hygiene, sealthightness and cleanability, as for example required in the Pharmaceutical Industry are met.

In the embodiment described, all connectors are designed according to the TRI-CLAMP standard. This is the preferred standard in industries, where high standards of hygiene are compulsory. In other industries, other standard connectors may be used in combination with the invention. The TRI-CLAMP connectors 27, 15, 13, 9 can for example be replaced by flanges according to ISO, DIN or other industrial standards.

What is claimed is:

1. An arrangement for measurement of a level of a medium in a container, comprising:
    a mounting section surrounding an opening of the container,
    a tubular adapter having a first standard connector located on a first end of said tubular adapter and a second standard connector located on a second end of said tubular adapter, said tubular adapter being mounted on said mounting section of the container by said first standard connector;
    an isolation window transparent for microwaves for sealing a passageway through said tubular adapter, and having an outer rim, which is clamped between said mounting section and said first standard connector; and
    a microwave level measurement device, including a housing, which is mounted on a tube, said tube comprising a process connector located on an end of the tube for mounting said microwave level measurement device on said second standard connector of said tubular adapter, and an antenna, which is entirely located inside the tube, wherein:
    said tubular adapter allows for removal of the entire microwave level measurement device without breaking the seal of the container provided by said isolation window;
    said isolation window further has a cone including a tip which faces the container.

2. The arrangement according to claim 1, wherein:
    a gasket is inserted between said mounting section of the container and said tubular adapter.

3. The arrangement according to claim 1, wherein:
    said isolation window is made of a plastic material.

4. The arrangement according to claim 1, wherein:
    said first standard connection and said second standard connection are formed as flanges.

5. A microwave transparent process seal for mounting on a mounting section surrounding an opening of a container, and used with a microwave level measurement, device, including a housing, which is mounted on a tube, said tube comprising a process connector located on an end of said tube for mounting said microwave level measurement device, and an antenna which is entirely located inside said tube, comprising:
    a tubular adapter, said tubular adapter having a first standard connector located on a first end for mounting said tubular adapter on said mounting section of the container, and a second standard connector located on a second end of said tubular adapter onto which the entire microwave level measurement device is to be mounted via the process connector of said tube; and
    an isolation window transparent for microwaves, for sealing a passageway through said tubular adapter, and having an outer rim, which is clamped between said mounting section and said first standard connector, when said tubular adapter is mounted on said mounting section, wherein:
    said tubular adapter allows for removal of said entire microwave level measurement device without braking the seal of the container provided by said isolation window, and
    said isolation window further has a cone including a tip which faces the container.

* * * * *